United States Patent [19]
Arnholt et al.

[11] 4,103,934
[45] Aug. 1, 1978

[54] FOLDING SEAT AND WHEELCHAIR RESTRAINT

[75] Inventors: Jack C. Arnholt, Loudonville; Ronald J. Main, Wooster, both of Ohio

[73] Assignee: Rohr Industries, Incorporated, Chula Vista, Calif.

[21] Appl. No.: 823,211

[22] Filed: Aug. 10, 1977

[51] Int. Cl. .............................................. B60r 21/10
[52] U.S. Cl. .................................. 280/744; 280/751; 297/335
[58] Field of Search .................... 280/751, 744, 179 R; 297/335, 336, 250

[56] References Cited
U.S. PATENT DOCUMENTS

| | | | |
|---|---|---|---|
| 2,700,412 | 1/1955 | Evans | 297/335 |
| 3,194,601 | 7/1965 | Hoven | 297/336 |
| 3,934,898 | 1/1976 | Long | 280/751 |
| 3,948,556 | 4/1976 | Hyde | 297/250 |

*Primary Examiner*—Robert R. Song

*Attorney, Agent, or Firm*—Patrick J. Schlesinger; Frank D. Gilliam; Charles C. Logan

[57] ABSTRACT

A folding seat and wheelchair restraint assembly having a vehicle passenger seat and a barrier assembly. The vehicle passenger seat has a seat back portion and a seat bottom portion that is pivotally attached to the seat back portion whereby the seat bottom portion, which is normally horizontally oriented, may be pivoted to a vertical orientation. A restraint arm assembly is pivotally secured to the underside of the seat bottom portion in such a manner that it may be pivoted in a substantially horizontal plane when the seat bottom portion is folded upwardly in its vertical orientation. The barrier assembly has a complete seat belt unit with a retractable seat belt member and a non-retractable seat belt member attached to the barrier assembly. The retractable seat belt member is mounted on said barrier within a casing that is positioned on the barrier wherein it may also function as a support surface for the seat bottom portion of the folding seat when it is in a substantially horizontal position.

6 Claims, 4 Drawing Figures

FOLDING SEAT AND WHEELCHAIR RESTRAINT

BACKGROUND OF THE INVENTION

The invention relates to devices and structure to be utilized by a passenger in a wheelchair to secure himself and his wheelchair while traveling in the vehicle. More particularly, the invention relates to a folding seat on a vehicle such as a bus or train, that can function in a normal manner for the conventional passenger, while having the adaptability of being utilized to aid in securing a passenger confined to a wheelchair.

In the past, persons confined to wheelchairs have experienced great difficulty in being able to ride in vehicles while remaining in their wheelchairs. Typically, when a wheelchair occupant is taken for a ride in an automobile, the person is removed from the wheelchair and lifted into one of the various seats of the automobile, and the wheelchair is then placed in the trunk or a luggage carrying area. A few inventions have been directed to wheelchair ramps for automobiles, such as U.S. Pat. No. 3,651,965, that allows the wheelchair occupant to remain in his wheelchair in the vehicle. In these devices, the area within the automobile into which the wheelchair can be maneuvered is limited and little problems exist with respect to restraining its movements once positioned within the vehicle during travel of the vehicle.

A few inventions have been directed primarily toward vehicle's having a van-type structure that has utilized a retractable ramp for loading the wheelchair occupant into the vehicle, such as seen in U.S. Pat. No. 3,711,882. Other inventions utilize a hydraulic lift type structure, such as illustrated in U.S. Pat. No. 3,613,917 and 3,913,759. These inventions all are directed to getting the wheelchair occupant into and out of the vehicle, but do not relate to the matter of preventing the wheelchair from moving around in the vehicle during travel, and primarily rely on the brake unit of the wheelchair to control this. Additionally, the vehicles into which the inventor's structures have been designed are not ones that are designed to be used as public conveyances wherein other passengers would be able to walk into and out of the vehicles in an upstanding position.

It is an object of the invention to provide a novel structure that may be used to restrain the movement of a wheelchair occupant while traveling in a public carrier.

It is also an object of the invention to provide a novel wheelchair restraint assembly which, when not in use, allows the vehicle to be utilized in a normal manner.

It it also an object of the invention to provide a novel wheelchair restraint assembly that can be quickly adapted from normal passenger usage to its position where it functions as a wheelchair restraint device.

It is a further object of the invention to provide a novel wheelchair restraint assembly that is economical to manufacture and install in a public carrier vehicle.

It is an additional object of the invention to provide a novel wheelchair restraint assembly which is designed to keep the wheelchair occupant out of the stream of traffic flowing into and out of the vehicle.

SUMMARY OF THE INVENTION

The folding seat and wheelchair restraint assembly has a vehicle passenger seat having a seat back portion and a seat bottom portion. The seat bottom portion is pivotally attached to the seat back portion, whereby the seat bottom portion which is normally horizontally oriented may be pivoted to a vertical orientation. Thus, the seat functions as an ordinary seat when it is not being utilized as part of the wheelchair restraint assembly.

Attached to the underside of the seat bottom portion is a restraint arm assembly. This assembly has an arm member that is pivotally attached to a mounting plate secured to the underside of the seat bottom portion. The arm member is pivotally attached to the mounting bracket in such a manner that it may be pivoted in a substantially horizontal plane when the seat bottom portion is folded upwardly in a vertical orientation. The arm member would lock in position after travelling through an approximately 90° arc. The arm member is made from a tubular frame covered by a resilient padding.

The second major component of the folding seat and wheelchair restraint assembly is the barrier assembly. It is secured at its bottom to the floor of the vehicle and also to the side wall of the vehicle. The barrier assembly has a seat belt unit comprising a retractable seat belt member and a non-retractable seat belt member secured to the assembly. The retractable seat belt member has a casing within which the retractable seat belt member retracts and this casing is mounted on the barrier in such a position as to also function as a support surface for the seat bottom portion of the folding seat when it is in its substantially horizontal position.

DESCRIPTION OF THE PREFERRED EMBODIMENT

Figure 1:
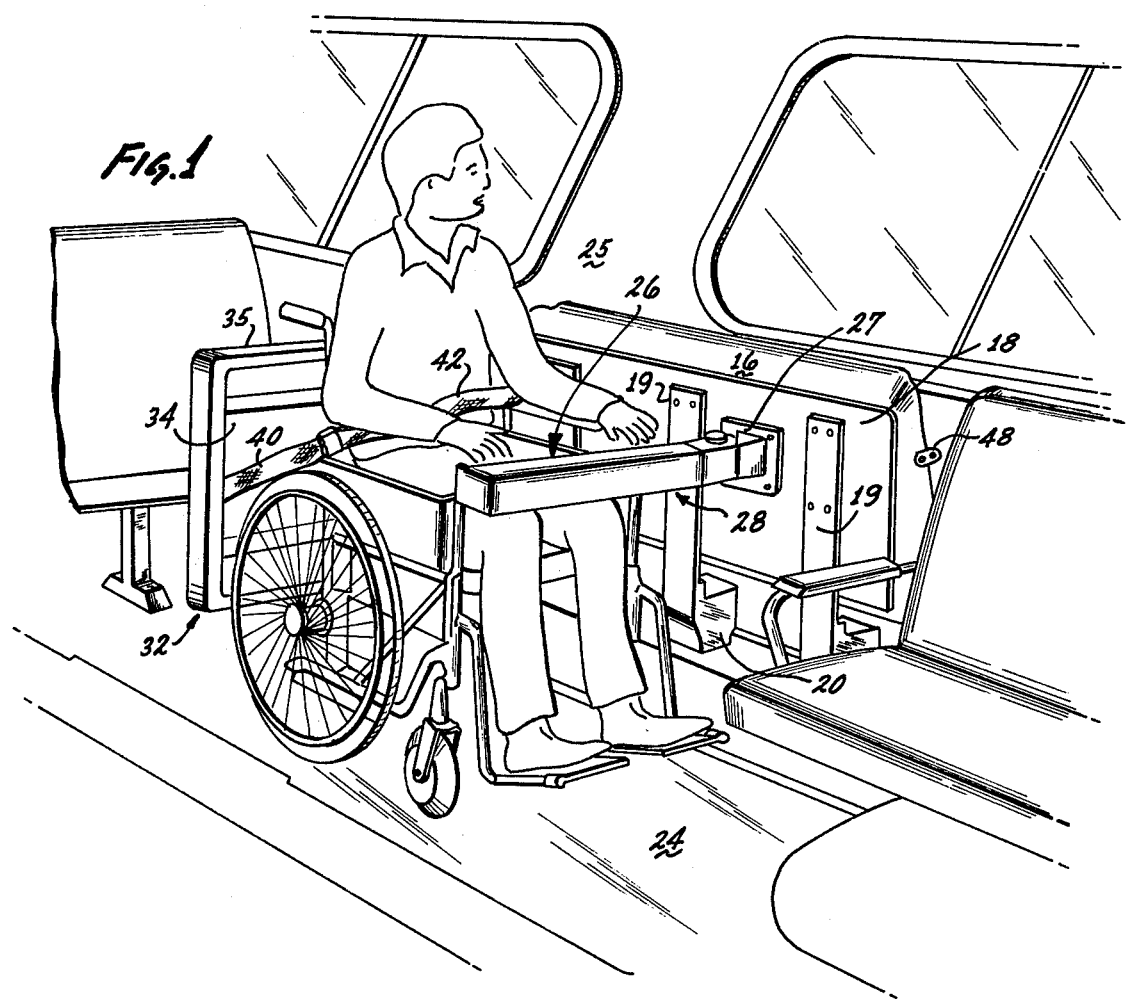
FIG. 1 is a perspective view illustrating the manner in which the folding seat and wheelchair restraint assembly is utilized by the occupant of a wheelchair.
Figure 2:
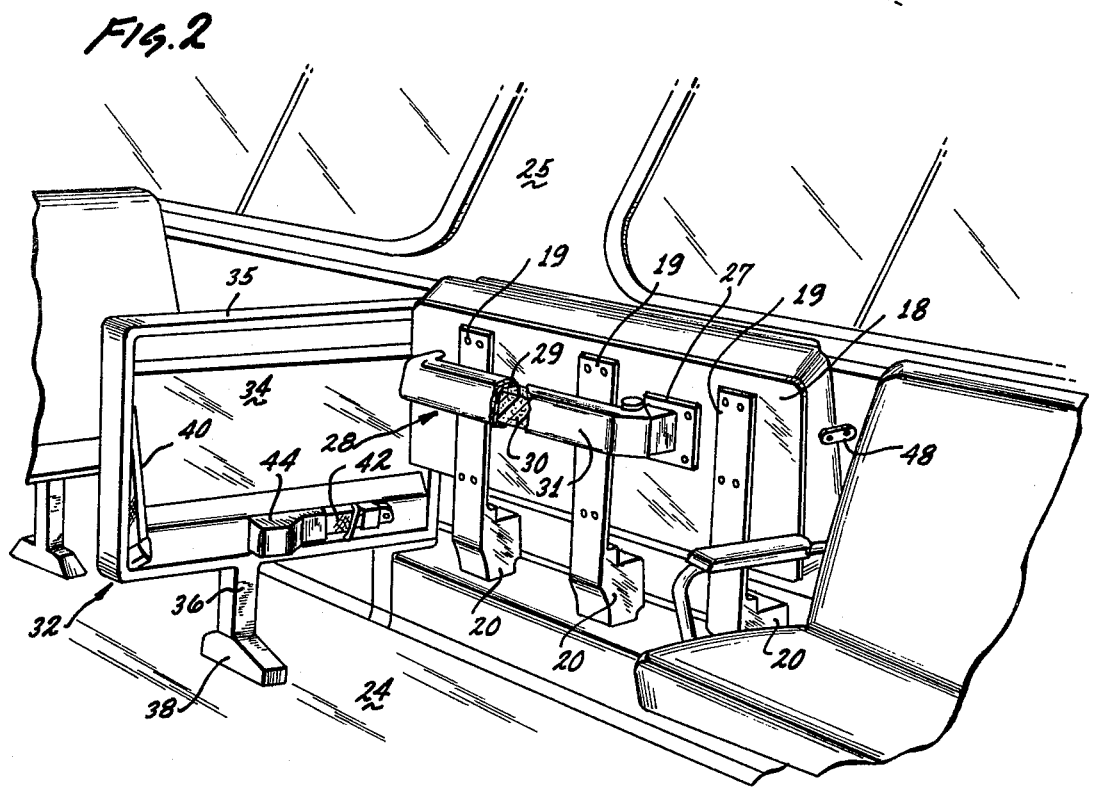
FIG. 2 is a perspective view of the folding seat and wheelchair restraint assembly preparatory to the occupant of the wheelchair being placed in position.
Figure 3:
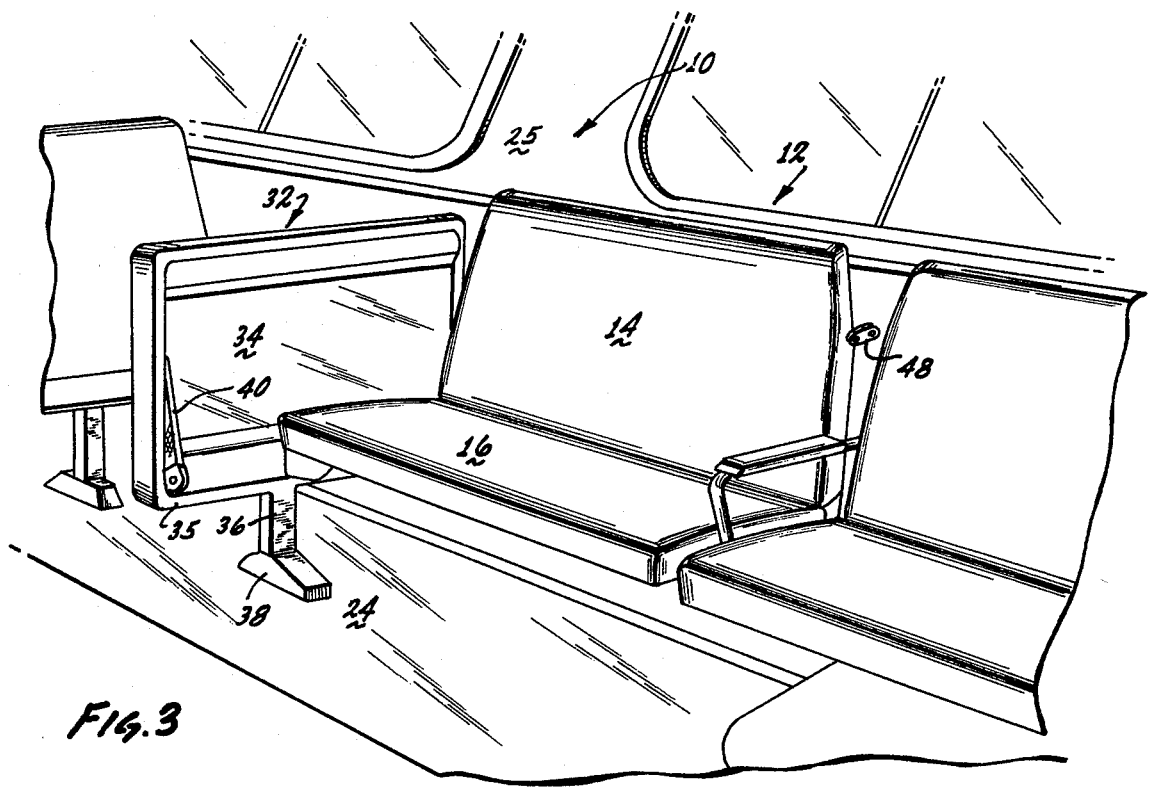
FIG. 3 is a perspective view of the folding seat and wheelchair restraint assembly as it appears when the assembly is being used in its conventional manner by nonwheelchair occupant passengers.
Figure 4:
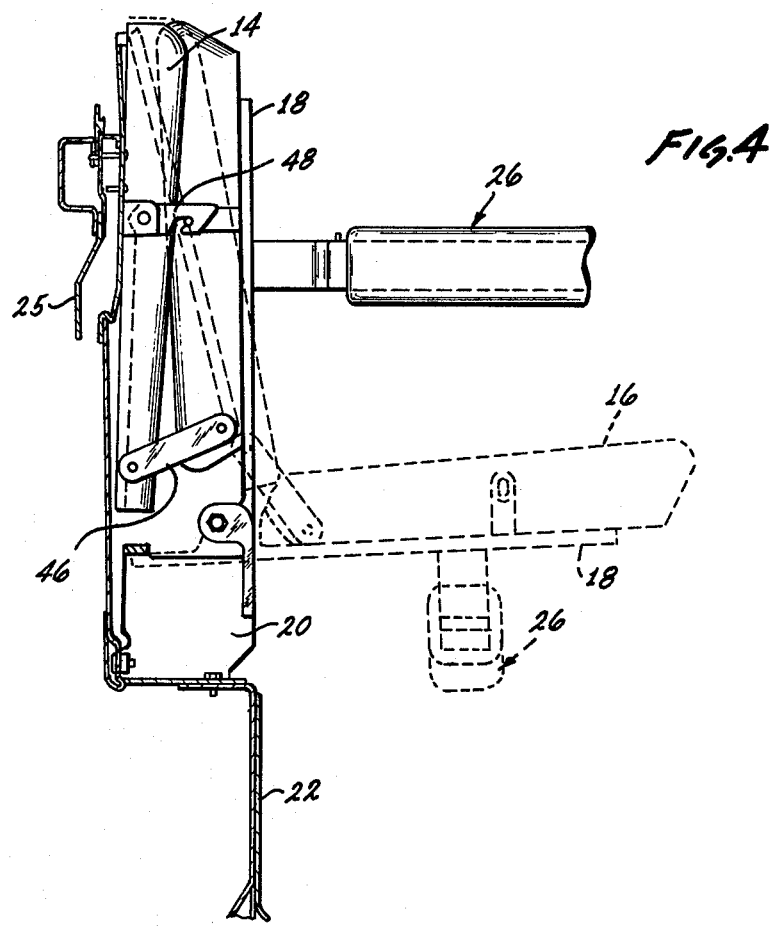
FIG. 4 is a partial side elevation view illustrating the seat bottom portion in the vertical position and in its horizontal position.

Referring to FIGS. 1 through 3, the folding seat and wheelchair restraint assembly is generally designated numeral 10. It is comprised of a vehicle passenger seat 12 and a barrier assembly 32.

The vehicle passenger seat 12 in the illustrated embodiment is an elongated side facing seat having a back portion 14 and a bottom portion 16. The bottom panel 18 of the bottom portion 16 has a plurality of support arms 19 having their one end secured thereto and their opposite end pivotally secured in the mounting brackets 20. Seat mounting brackets 20 are laterally spaced with respect to each other and are attached at their bottom to the L-shaped support panel 22 extending upwardly from the floor 24 of the vehicle. These L-shaped support panels 22 are spaced outwardly a small distance from the side wall 25 of the vehicle. At the opposite ends of back portion 14 and bottom portion 18 are hinges 46 to aid in maintaining and facilitating alignment of these two members when bottom portion 18 is folded between its horizontal and vertical positions. Latches 48 are utilized to secure these two members together when seat bottom portion 18 is in the vertical position.

Also attached to the underside of the seat bottom 16 is the restraint arm assembly 26. This assembly is comprised of mounting bracket 27 and arm member 28 that is pivotally attached thereto. Arm member 28 is made of a tubular frame 29 surrounded by foam cushion 30 and having a cover 31.

The barrier assembly 32 is comprised of a panel 34 surrounded by a frame 35. A post 36 extends downwardly from the frame and is secured to the floor 24 by mounting base 38. A seat belt unit having a non-retractable seat belt member 40 and a retractable seat belt member 42 are attached to the barrier assembly. Retractable seat belt member has its retractable mechanism in casing 44 that is mounted on the barrier assembly in such a position as to function as a support surface for seat bottom portion 16 when it is in its substantially horizontal position.

What is claimed is:

1. A wheelchair restraint assembly for a vehicle comprising:
    a barrier fixedly attached to said vehicle and positioned substantially transverse to the longitudinal axis of said vehicle;
    a vehicle passenger seat having a seat back portion fixedly secured to said vehicle and a seat bottom portion pivotally attached to said seat back portion, said seat bottom portion pivotable between a normal horizontally oriented passenger seating position and a vertical oriented passenger non-seating position; and
    a restraint arm pivotally attached to the under surface of said seat bottom portion, said restraint arm being pivotable between a stored position adjacent said seat bottom portion oriented substantially parallel to said longitudinal axis of said vehicle to a wheel chair restraint position substantially parallel to said barrier whereby a wheelchair positioned between said barrier and said restraint arm is restrained thereby.

2. A folding seat and wheelchair restraint assembly as recited in claim 1 wherein said arm member comprises a tubular frame covered by resilient padding.

3. a folding seat and wheelchair restraint assembly as recited in claim 2 further comprising latching means to keep said seat bottom portion secured to said seat back portion when said seat bottom portion has been folded into its vertical position.

4. A folding seat and wheelchair restraint assembly as recited in claim 1 wherein said means for pivotally attaching said seat bottom to said seat back portion comprises
    a plurality of support arms transversely secured to the underside of said seat bottom portion, said support arms being laterally spaced with respect to each other,
    a plurality of seat mounting brackets,
    said support arms being pivotally attached to said seat mounting brackets, and
    hinge means attaching the bottom of said seat back portion to the rear of said seat bottom portion.

5. A folding seat and wheelchair restraint assembly as recited in claim 1 further comprising seat belt means secured to said barrier assembly, said seat belt means comprising a retractable seat belt member and a non-retractable seat belt member.

6. A folding seat and wheelchair restraint assembly as recited in claim 5 further comprising a casing within which said retractable seat belt member retracts mounted on said barrier in such a position as to also function as a support surface for seat bottom portion of said folding seat when it is in a substantially horizontal position.

* * * * *